UNITED STATES PATENT OFFICE.

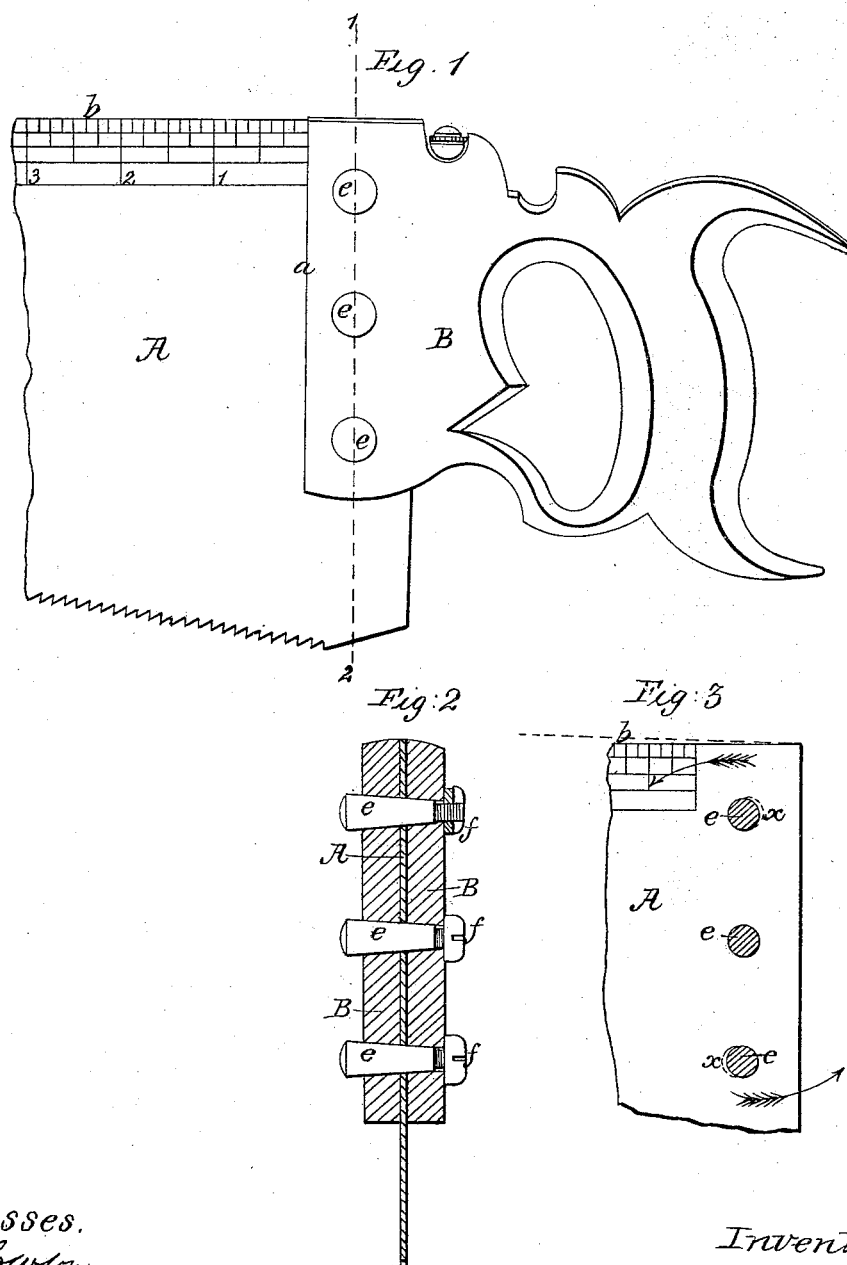

HENRY DISSTON, OF PHILADELPHIA, PENNSYLVANIA.

METHOD OF SECURING HANDLES ON HANDSAWS.

Specification of Letters Patent No. 27,354, dated March 6, 1860.

*To all whom it may concern:*

Be it known that I, HENRY DISSTON, of the city and county of Philadelphia and State of Pennsylvania, have invented a new and useful Improvement in Handsaws; and I do hereby declare the following to be a full, clear, and exact description of the same, reference being had to the accompanying drawing and to the letters of reference marked thereon.

My invention consists in attaching the blade of a hand saw to the handle by means of taper pins screwed at the ends and furnished with nuts, so that when the blade by constant or excessive strains becomes loose in the handle, it may be readily tightened, as fully described hereafter.

In order to enable others skilled in the art to make and use my invention I will now proceed to describe its construction and operation.

On reference to the accompanying drawing which forms a part of this specification, Figure 1 is a side view illustrating my improvement as applied to a combined hand saw and square. Fig. 2, a section on the line 1, 2, Fig. 1, and Fig. 3, a detached view of part of the blade.

A represents the handle and B the blade of the saw, the shoulder $a$ formed by the handle on each side of the blade, being at right angles to the upper edge of the said blade, so that the saw may serve the purpose of a square.

The blade is secured to the handle by means of the taper pins $e$, which pass through openings made in the handle and blade simultaneously by a suitable tool, the small ends of the pins being screwed and furnished with nuts $f$. By constant use and excessive strains the blades of saws are apt to become loose in the handles, an evil which cannot be remedied by the ordinary straight pins used for securing the handle and blade together. By withdrawing the taper pins $e$ however, removing the blade, slightly enlarging the holes in the latter, and after replacing the blade driving in the pins, a loose blade may be firmly and tightly secured to the handle.

Although my improvement is well adapted to the construction of ordinary hand saws, it is especially applicable to the adjustment of the blades of combined handsaws and squares, when the said blades have become so far out of truth with the shoulder of the handle, that the instrument ceases to be of service as a square.

Supposing the blade of a combined hand saw and square to have become so far out of truth with the handle that its upper edge has assumed the position shown by the red line $b$ in Fig. 3, in which case the outer end of the blade will be unduly elevated, and before it can perform, with the shoulders of the handle, the duty of a square it must be lowered. I withdraw the taper pins remove the blade, and with a round file or other suitable tool, enlarge the upper and lower holes of the blade in the direction shown by the red lines $x$ $x$, to an extent which is deemed sufficient for the purpose. After this the blade is replaced in the handle, the pins reinserted, and the upper and lower pins driven in to such an extent that they will fit the slightly enlarged holes. Now in driving these pins the wood of the handle will yield equally in every direction, the pins taking the direct course of the holes bored in the wood for their reception, so that the act of driving the upper and lower pins will cause the blade to partially turn on the center pin in the direction of the arrow, the outer end of the blade being thereby lowered so that its upper edge shall assume its proper position in respect to the shoulders $a$ of the handle. The same end may be accomplished by allowing the upper orifice of the blade to remain undisturbed and by filing out the two lower orifices the lowest one being filed to a greater extent than the other, in fact, it will be readily seen without further description that by the use of the taper pins and an appropriate enlargement of the orifices of the blade in the proper direction the upper edge of the blade may be adjusted to the proper position at right angles with the shoulders no matter in what direction it may have previously become out of truth.

I claim as my invention and desire to secure by Letters Patent.

The application of the taper pins $e\ e$ with their screwed ends and their nuts $f$, to the manufacture of hand saws in the manner and for the purpose herein set forth.

In testimony whereof I have signed my name to this specification, in the presence of two subscribing witnesses.

HENRY DISSTON.

Witnesses:
 HENRY HOWSON,
 A. H. SHOEMAKER.